(12) United States Patent
Goma et al.

(10) Patent No.: US 10,033,217 B2
(45) Date of Patent: Jul. 24, 2018

(54) WIRELESS POWER RECEIVER DEVICE, WIRELESS POWER TRANSMITTER DEVICE, AND WIRELESS POWER TRANSCEIVER DEVICE

(71) Applicant: Murata Manufacturing Co., Ltd., Nagaokakyo-shi, Kyoto-fu (JP)

(72) Inventors: Shinji Goma, Nagaokakyo (JP); Kazuya Kato, Nagaokakyo (JP); Tsutomu Ieki, Nagaokakyo (JP)

(73) Assignee: MURATA MANUFACTURING CO., LTD., Nagaokakyo-Shi-Kyoto-Fu (JP)

( * ) Notice: Subject to any disclaimer, the term of this patent is extended or adjusted under 35 U.S.C. 154(b) by 328 days.

(21) Appl. No.: 14/632,704

(22) Filed: Feb. 26, 2015

(65) Prior Publication Data

US 2015/0222130 A1 Aug. 6, 2015

Related U.S. Application Data

(63) Continuation of application No. PCT/JP2013/069042, filed on Jul. 11, 2013.

(30) Foreign Application Priority Data

Oct. 17, 2012 (JP) ................. 2012-230026

(51) Int. Cl.
*H02J 7/02* (2016.01)
*H02J 50/80* (2016.01)
(Continued)

(52) U.S. Cl.
CPC .............. *H02J 7/025* (2013.01); *H01F 38/14* (2013.01); *H02H 7/10* (2013.01); *H02J 5/005* (2013.01);
(Continued)

(58) Field of Classification Search
CPC .. H02J 5/005; H02J 50/05; H02J 17/00; H02J 7/025; H01F 38/14; H02H 7/10; H02M 3/22; H01Q 1/00
See application file for complete search history.

(56) References Cited

U.S. PATENT DOCUMENTS

2008/0179963 A1* 7/2008 Fouquet ................. H01F 19/08
307/104
2009/0058361 A1* 3/2009 John ..................... A61N 1/3785
320/128

(Continued)

FOREIGN PATENT DOCUMENTS

EP 1 221 753 A2 7/2002
JP 3344593 B2 11/2002

(Continued)

OTHER PUBLICATIONS

International Search Report dated Sep. 10, 2013, International Application No. PCT/JP2013/059042.

*Primary Examiner* — Kenneth B Wells
(74) *Attorney, Agent, or Firm* — Arent Fox LLP

(57) ABSTRACT

A wireless power receiver device includes a sheet-like electrode sheet section and a power receiver section. The electrode sheet section includes a power receiver side active electrode and a power receiver side passive electrode that are substantially coplanar and formed into sheet-like shapes; lead lines that are coplanar with both the electrodes, extended from the respective electrodes, and formed into sheet-like shapes; and an insulation sheet that covers both the electrodes and both the lead lines from both sides thereof. The power receiver section includes a step-down unit that steps down an alternating-current voltage induced between end portions of the lead lines; a power receiver module that rectifies and smoothes the alternating-current voltage that is stepped down by the step-down unit; and a (Continued)

connector for outputting an output voltage of the power receiver module.

12 Claims, 18 Drawing Sheets

(51) Int. Cl.
| | |
|---|---|
| H02J 50/12 | (2016.01) |
| H01F 37/00 | (2006.01) |
| H02J 50/40 | (2016.01) |
| H02J 50/70 | (2016.01) |
| H02J 50/10 | (2016.01) |
| H02J 17/00 | (2006.01) |
| H01F 38/14 | (2006.01) |
| H02H 7/10 | (2006.01) |
| H02J 5/00 | (2016.01) |
| H02M 3/22 | (2006.01) |
| H02J 50/05 | (2016.01) |
| H01Q 1/00 | (2006.01) |

(52) U.S. Cl.
CPC .............. *H02J 17/00* (2013.01); *H02J 50/05* (2016.02); *H02J 50/10* (2016.02); *H02J 50/40* (2016.02); *H02J 50/70* (2016.02); *H02M 3/22* (2013.01); *H01Q 1/00* (2013.01)

(56) References Cited

U.S. PATENT DOCUMENTS

| | | | | |
|---|---|---|---|---|
| 2010/0007215 | A1* | 1/2010 | Sakuma | H01F 38/14 307/104 |
| 2010/0156193 | A1* | 6/2010 | Rhodes | G06F 1/1632 307/104 |
| 2010/0244579 | A1* | 9/2010 | Sogabe | H01F 38/14 307/104 |
| 2012/0181980 | A1 | 7/2012 | Ichikawa et al. | |
| 2012/0299392 | A1 | 11/2012 | Ichikawa et al. | |
| 2013/0002040 | A1* | 1/2013 | Morishita | H01F 38/14 307/104 |
| 2014/0015337 | A1 | 1/2014 | Takeuchi et al. | |
| 2014/0035380 | A1* | 2/2014 | Stevens | H02J 5/005 307/104 |
| 2015/0170829 | A1* | 6/2015 | Waffenschmidt | H01F 27/365 320/108 |

FOREIGN PATENT DOCUMENTS

| | | |
|---|---|---|
| JP | 2006-510101 A | 3/2006 |
| JP | 2011-083132 A | 4/2011 |
| JP | 2012-050256 A | 3/2012 |
| JP | 2013-126294 A | 6/2013 |
| WO | WO 2010/150316 A1 | 12/2010 |
| WO | WO 2011/148803 A1 | 12/2011 |
| WO | WO 2012/132929 A1 | 10/2012 |
| WO | WO 2013/024417 A2 | 2/2013 |

* cited by examiner

FIG. 3
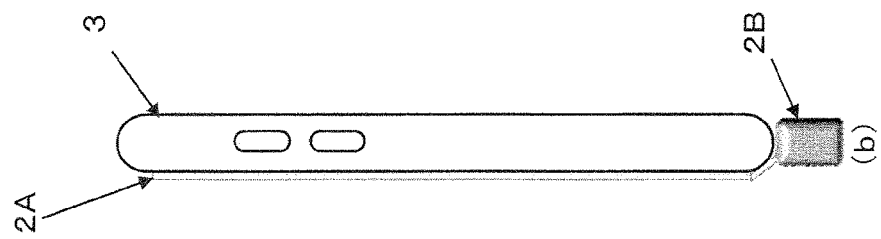
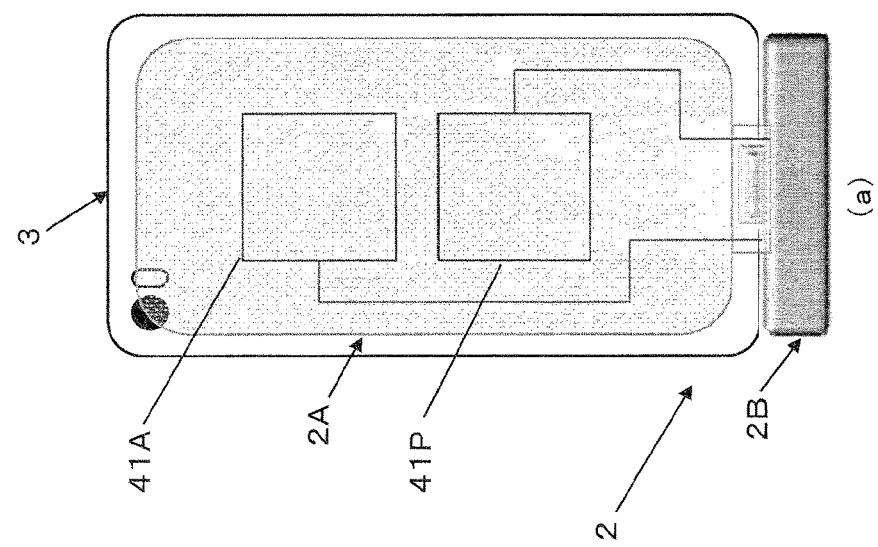

WIRELESS POWER RECEIVER DEVICE, WIRELESS POWER TRANSMITTER DEVICE, AND WIRELESS POWER TRANSCEIVER DEVICE

CROSS REFERENCE TO RELATED APPLICATIONS

The present application is a continuation of PCT/JP2013/069042 filed Jul. 11, 2013, which claims priority to Japanese Patent Application No. 2012-230026, filed Oct. 17, 2012, the entire contents of each of which are incorporated herein by reference.

FIELD OF THE INVENTION

The present invention relates to wireless power receiver devices, wireless power transmitter devices, and wireless power transceiver devices for use in wireless transmission of electric power.

BACKGROUND OF THE INVENTION

In recent years, wireless power transmission systems are put to practical use for wirelessly transmitting electric power to electronic devices such as smartphones, tablet terminals, and the like. For example, Patent Documents 1 to 3 describe such wireless power transmission systems.

Patent Document 1 discloses an electromagnetic induction type wireless power transmission system. The electromagnetic induction type wireless power transmission system includes a wireless power transmitter device and a wireless power receiver device. The wireless power transmitter device includes a power transmitter coil, and the wireless power receiver device includes a power receiver coil. Electric power is transmitted between these coils.

Patent Document 2 discloses an electromagnetic induction type wireless power receiver device.

Patent Document 3 discloses a capacitive coupling type wireless power transmission system. The capacitive coupling type wireless power transmission system includes a wireless power transmitter device and a wireless power receiver device. The wireless power transmitter device includes a power transmitter electrode, and the wireless power receiver device includes a power receiver electrode. Electric power is transmitted between these electrodes via electrostatic induction.

Patent Document 1: Japanese Patent No. 3344593
Patent Document 2: Japanese Unexamined Patent Application Publication (Translation of PCT Application) No. 2006-510101
Patent Document 3: International Publication No. 2011/148803

There is a need for wireless power transmission in conventional electronic devices such as smartphones, tablet terminals, and the like, which have no wireless power transmission capability. It is considered that one way of satisfying the need is to attach an external wireless power receiver device to the foregoing electronic device. Here, these electronic devices are being downsized and made thinner to improve user-friendliness. Thus, even for such an external wireless power receiver device, it is desirable to have a smaller and thinner shape.

SUMMARY OF THE INVENTION

An object of the present invention is to provide a wireless power receiver device, a wireless power transmitter device, and a wireless power transceiver device, which are downsized and made thinner.

In the first aspect of the present invention, a wireless power receiver device is provided.

The wireless power receiver device includes an electrode sheet section having a sheet-like shape and a power receiver section, the electrode sheet section including an active electrode and a passive electrode that are substantially coplanar and formed into sheet-like shapes, lead lines that are coplanar with both the electrodes, respectively extended from the electrodes, and formed into sheet-like shapes, and an insulation sheet that covers both the electrodes and both the lead lines from both sides thereof, the power receiver section including a step-down unit that steps down an alternating-current voltage induced between end portions of the lead lines, A rectifying-and-smoothing unit that rectifies and smoothes the alternating-current voltage that is stepped down by the step-down unit, and a connector for outputting an output voltage of the rectifying-and-smoothing unit.

In the second aspect of the present invention, a wireless power transmitter device is provided.

The wireless power transmitter device includes an electrode sheet section having a sheet-like shape and a power transmitter section, the electrode sheet section including an active electrode and a passive electrode that are substantially coplanar and formed into sheet-like shapes, lead lines that are coplanar with both the electrodes, respectively extended from the electrodes, and formed into sheet-like shapes, and an insulation sheet that covers both the electrodes and both the lead lines from both sides thereof, the power transmitter section including an inverter unit that converts a direct-current voltage to an alternating-current voltage having a predetermined frequency, and a step-up unit that steps up the alternating-current voltage outputted from the inverter unit and applies to end portions of the lead lines.

In the third aspect of the present invention, a wireless power transceiver device is provided.

The wireless power transceiver device includes an electrode sheet section having a sheet-like shape, a power receiver section, a power transmitter section, and a selector unit, the electrode sheet section including an active electrode and a passive electrode that are substantially coplanar and formed into sheet-like shapes, lead lines that are coplanar with both the electrodes, respectively extended from the electrodes, and formed into sheet-like shapes, and an insulation sheet that covers both the electrodes and both the lead lines from both sides thereof, the power receiver section including a step-down unit that steps down an alternating-current voltage induced between end portions of the lead lines, a rectifying-and-smoothing unit that rectifies and smoothes the alternating-current voltage that is stepped down by the step-down unit, and a connector for outputting an output voltage of the rectifying-and-smoothing unit, the power transmitter section including an inverter unit that converts a direct-current voltage to an alternating-current voltage having a predetermined frequency, and a step-up unit that steps up the alternating-current voltage outputted from the inverter unit and applies to end portions of the lead lines, the selector unit being configured to connect alternatively the end portions of the lead lines to one of an output section of the step-up unit and an input section of the step-down unit.

In the fourth aspect of the present invention, a wireless power transceiver device is provided.

The wireless power transceiver device includes an electrode sheet section, a transformer unit, a power receiver section, a power transmitter section, and a selector unit, the electrode sheet section including an active electrode and a passive electrode that are substantially coplanar and formed into sheet-like shapes, lead lines that are coplanar with both the electrodes, respectively extended from the electrodes, and formed into sheet-like shapes, and an insulation sheet that covers both the electrodes and both the lead lines from both sides, the transformer unit being connected to end portions of the lead lines at a high voltage side thereof, the power receiver section including a rectifying-and-smoothing unit that rectifies and smoothes an alternating-current voltage that is stepped down by the transformer unit, and a connector for outputting an output voltage of the rectifying-and-smoothing unit, the power transmitter section including an inverter unit that converts a direct-current voltage to an alternating-current voltage having a predetermined frequency, the selector unit being configured to selectively connect a lower voltage side of the transformer unit to output of the inverter unit of the power transmitter section or to input of the rectifying-and-smoothing unit of the power receiver section.

In the wireless power receiver device, the wireless power transmitter device, and the wireless power transceiver device, a portion including the active electrode and the passive electrode is formed into the sheet-like electrode sheet section. Thus, the portion including the active electrode and the passive electrode may be made thinner. Accordingly, the wireless power receiver device, the wireless power transmitter device, and the wireless power transceiver device as a whole may be made thinner and therefore made smaller.

BRIEF DESCRIPTION OF DRAWINGS

FIG. 3 is a diagram depicting a state where a wireless power receiver device according to Embodiment 1 is attached to an electronic device.

DETAILED DESCRIPTION OF THE EXEMPLARY EMBODIMENTS

Embodiment 1

A power transmitter device according to Embodiment 1 is now described with reference to the drawings.

1. Configuration

Figure 1:
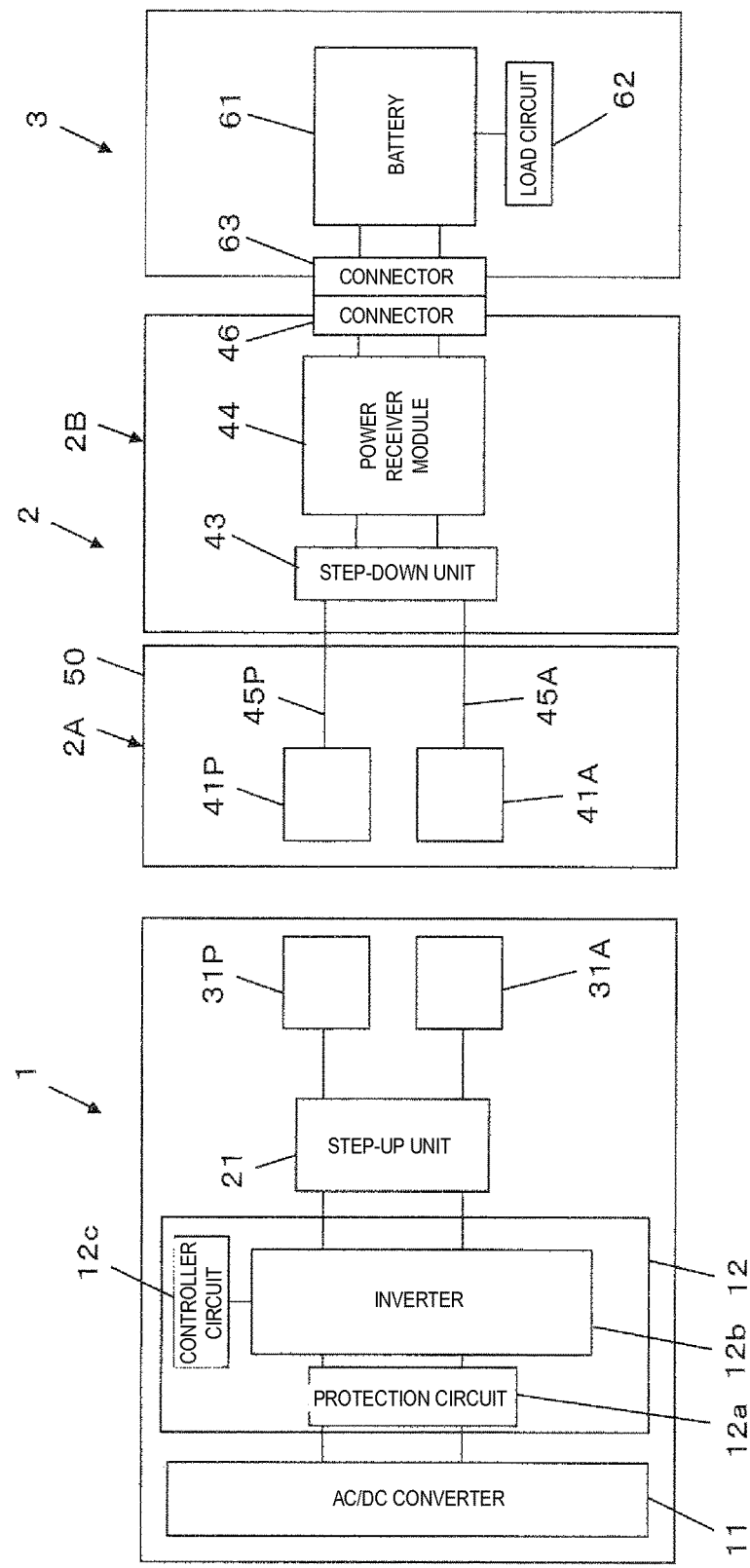
FIG. 1 is a block diagram depicting a configuration of a wireless power transmission system according to Embodiment 1.

FIG. 1 is a block diagram depicting the configuration of a wireless power transmission system according to Embodiment 1. The wireless power transmission system of the present embodiment is of a capacitive coupling type, and includes a wireless power transmitter device 1 and a wireless power receiver device 2. The wireless power transmitter device 1 transmits electric power to the wireless power receiver device 2 by capacitive coupling type wireless power transmission. The wireless power receiver device 2 converts the received electric power to a direct-current voltage suited for an electronic device 3 and provides it to the electronic device 3.

1.1 Configuration of Wireless Power Transmitter Device.

The wireless power transmitter device 1 includes an AC/DC converter 11, a power transmitter module 12, a step-up unit 21, and a power transmitter side passive electrode 31P and a power transmitter side active electrode 31A (power transmitter side electrode section).

The AC/DC converter 11 converts an alternating-current voltage inputted from a utility power supply or the like to a direct-current voltage of a predetermined voltage value. The predetermined value may be, for example, 10 to 20 volts. A battery may be provided between the secondary side of the AC/DC converter 11 and the primary side of the power transmitter module 12. Here, the battery is charged by the output of the AC/DC converter 11. This allows the wireless power transmitter device 1 to transmit electric power even in the case where no utility power supply is available.

The power transmitter module 12 includes a protection circuit 12a, an inverter 12b, and a controller circuit 12c.

The protection circuit 12a cuts off the connection between the AC/DC converter 11 and the inverter 12b in the event of, for example, overcurrent or overvoltage.

The inverter 12b converts the direct-current voltage from the AC/DC converter 11 to an alternating-current voltage of a predetermined voltage value and a predetermined frequency. The predetermined voltage value may be, for example, 10 to 20 volts. The predetermined frequency may be, for example, 1 kHz.

The controller circuit 12c controls operations of the power transmitter module 12 and the like.

The step-up unit 21 steps up the alternating-current voltage outputted from the inverter 12b of the power transmitter module 12. The step-up unit 21 is composed of, for example, a step-up transformer. The voltage after the boosting by the step-up unit 21 may be, for example, 100 V to 10 kV.

The voltage boosted by the step-up unit 21 is applied across the power transmitter side passive electrode 31P and the power transmitter side active electrode 31A.

When the power transmitter side passive electrode 31P and the power transmitter side active electrode 31A and a power receiver side passive electrode 41P and a power receiver side active electrode 41A of the wireless power receiver device 2, which will be described later, are at a predetermined opposing state, the coupling capacity is formed between these electrodes. Applying the voltage boosted by the step-up unit 21 across the power transmitter side passive electrode 31P and the power transmitter side active electrode 31A in this state causes the wireless power transmitter device 1 to transmit electric power to the power receiver device 2 by capacitive coupling.

The power transmitter side passive electrode 31P and the power transmitter side active electrode 31A are plate-like metal members.

1.2 Configuration of Wireless Power Receiver Device.

The wireless power receiver device 2 includes an electrode sheet section 2A and a power receiver section 2B.

The electrode sheet section 2A includes the power receiver side passive electrode 41P and the power receiver side active electrode 41A (power receiver side electrode section) and lead lines 45A and 45P. An insulation sheet 50 covers the power receiver side passive electrode 41P, the power receiver side active electrode 41A, and the lead lines 45A and 45P.

The power receiver side passive electrode 41P and the power receiver side active electrode 41A are sheet-like metal members such as, for example, metal foils having predetermined thicknesses.

The lead lines 45A and 45P connect the power receiver section 2B to the power receiver side passive electrode 41P and the power receiver side active electrode 41A. The lead lines 45A and 45P are sheet-like metal members such as, for example, metal foils having predetermined thicknesses.

The power receiver section 2B includes a step-down unit 43, a power receiver module 44, and a connector 46. The step-down unit 43 steps down an alternating-current voltage induced between the power receiver side passive electrode 41P and the power receiver side active electrode 41A (between end portions of the lead lines 45A and 45P, which will be described below). The step-down unit 43 is composed of, for example, a step-down transformer.

The power receiver module 44 includes a rectifying-and-smoothing circuit, a DC/DC converter, and the like. The rectifying-and-smoothing circuit rectifies the alternating-current voltage stepped down by the step-down unit 43 to a direct-current voltage and smoothes the direct-current voltage. The DC/DC converter converts the direct-current voltage rectified by the rectifying-and-smoothing circuit to a direct-current voltage suited for the electronic device 3, stabilizes the converted directed current voltage, and outputs to the connector 46.

The connector 46 is an interface for supplying electric power to the electronic device 3. The connector 46 is formed so as to match a connector 63 included in the electronic device 3.

1.3 Configuration of Electronic Device

The electronic device 3 includes a battery 61, a load circuit 62, and the connector 63. The electronic device 3 may be such as, for example, a smartphone, a tablet terminal, a music player, or the like.

The battery 61 stores direct-current electric power outputted from the DC/DC converter of the power receiver module 44 of the wireless power receiver device 2 while supplying the direct-current electric power to the load circuit 62.

The load circuit 62 executes predetermined functions relating to the electronic device 3.

The connector 63 is an interface for connecting with an external device. The connector 63 is capable of receiving electric power supplied from the external device. The connector 63 may be, for example, a connector based on a USB specification or a proprietary specification of the electronic device 3.

2. Structure of Wireless Power Receiver Device

Figure 2:
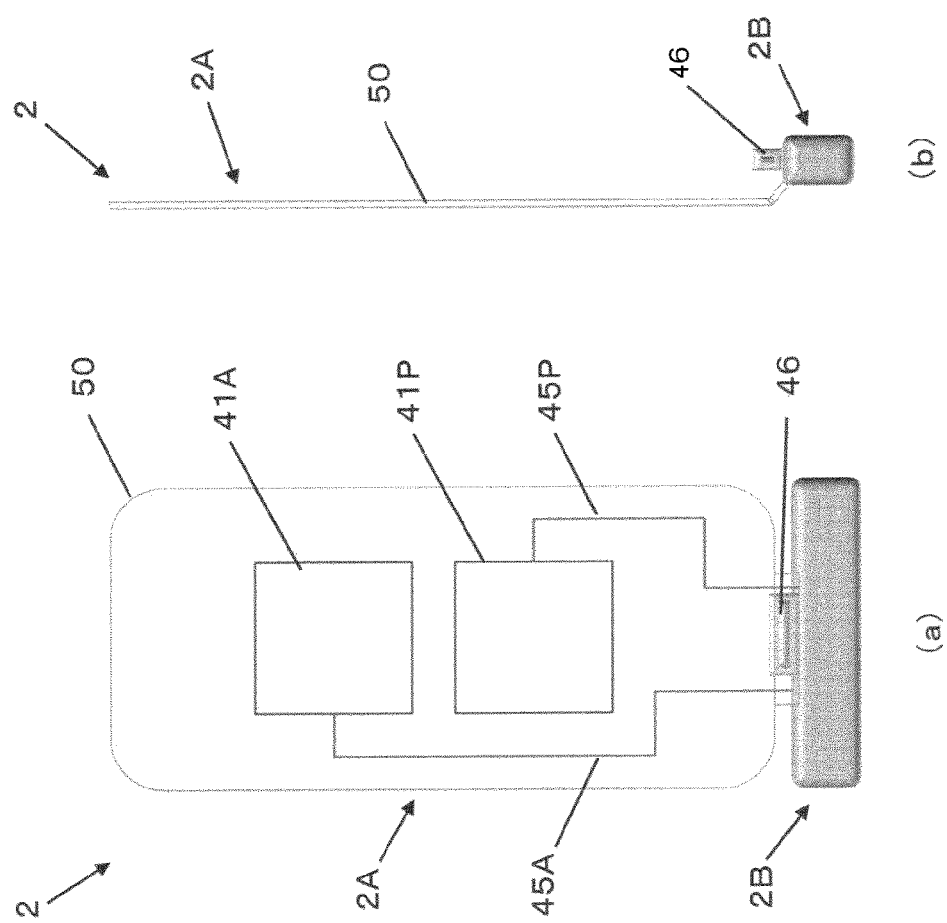
FIG. 2 is an external view of a wireless power receiver device according to Embodiment 1.

FIG. 2 is an external view of a wireless power receiver device according to Embodiment 1. Specifically, FIG. 2(*a*) is a rear view of the wireless power receiver device according to Embodiment 1. FIG. 2(*b*) is a side view of the wireless power receiver device according to Embodiment 1.

The wireless power receiver device 2 includes, as described above, the power receiver section 2B and the electrode sheet section 2A.

The power receiver section 2B is provided with the step-down unit 43, the power receiver module 44, and the connector 46, which are described above (see FIG. 1).

The electrode sheet section 2A is provided with the power receiver side passive electrode 41P and the power receiver side active electrode 41A. Further, the electrode sheet section 2A is provided with the lead lines 45A and 45P for connecting the power receiver section 2B to the power receiver side passive electrode 41P and the power receiver side active electrode 41A.

FIG. 3 is an external view depicting the state where the wireless power receiver device according to Embodiment 1 is attached to an electronic device. Specifically, FIG. 3(*a*) is a rear view in the state where the wireless power receiver device according to Embodiment 1 is attached to an electronic device. FIG. 3(*b*) is a side view in the state where the wireless power receiver device according to Embodiment 1 is attached to an electronic device.

As an example, Embodiment 1 describes a case where the electronic device 3 is a smartphone. The electrode sheet section 2A is attached to a back surface of the electronic device 3 (Rear surface. A side opposite to the side where a liquid crystal display is provided). Further, as will be described below, the electrode sheet section 2A inclusive of the power receiver side passive electrode 41P and the power receiver side active electrode 41A is transparent, and allows seeing the rear surface of the electronic device 3 therethrough. Further, the power receiver section 2B is fixed to the electronic device 3 by connecting the connector 46 and the connector 63 of the electronic device 3.

Figure 4:
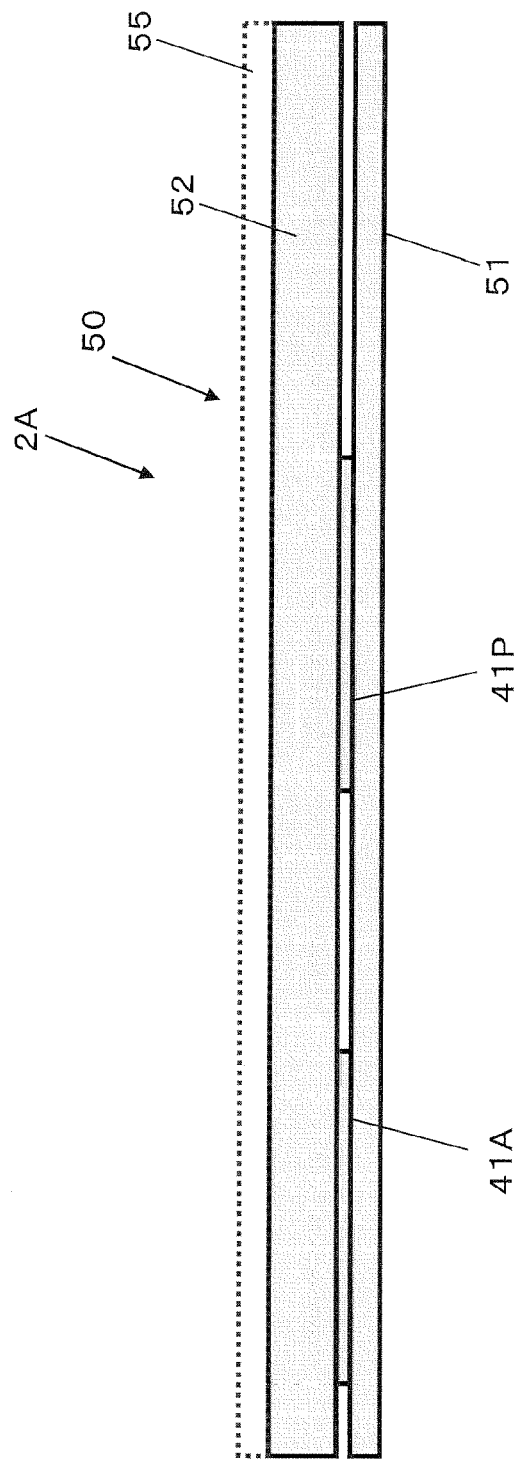
FIG. 4 is a cross sectional diagram of an electrode sheet section of a wireless power receiver device according to Embodiment 1.

FIG. 4 is a cross sectional diagram of the electrode sheet section 2A. The electrode sheet section 2A includes the insulation sheet 50 that covers the power receiver side passive electrode 41P and the power receiver side active electrode 41A, and the lead lines 45A and 45P. The power receiver side passive electrode 41P and the power receiver side active electrode 41A are coplanar. Further, although it is not illustrated, the lead lines 45A and 45P are also coplanar with the power receiver side passive electrode 41P and the power receiver side active electrode 41A. The insulation sheet 50 includes a front sheet 51 that forms a top surface (the surface opposite to the surface to which the electronic device 3 is attached) of the electrode sheet section 2A and a back sheet 52 that forms a back surface (the surface to which the electronic device 3 is attached) of the electrode sheet section 2A. The power receiver side passive electrode 41P and the power receiver side active electrode 41A are arranged between the front sheet 51 and the back sheet 52, and are covered with these sheets 51 and 52.

The power receiver side passive electrode 41P and the power receiver side active electrode 41A are metal foils. In the present embodiment, transparent metal foils are used as the metal foils. As the transparent metal foils, indium tin oxide (ITO) may be used, for example. The metal foils may have, for example, the thicknesses of about 1 μm. The same applies to the lead lines 45A and 45P.

The front sheet 51 and the back sheet 52 are resin sheets, respectively. The resin sheets may be made of, for example, urethane resin or silicon resin with adhesion property or insulation property. During electric power reception, a high voltage is generated between the passive electrode 41P and the active electrode 41A. Insulating and covering with the front sheet 51 and the back sheet 52 prevent discharge or electric shock caused when the electrode is brought into contact with another object or device failures associating with such discharge or electric shock. The front sheet 51 may have, for example, the thickness of about 0.02 to 0.1 mm. In the present embodiment, the resin sheets are transparent. The back sheet 52 may have, for example, the thickness of about 0.02 to 0.1 mm. It is preferable that the front sheet 51 has the smallest possible thickness in its thickness range described above, and that the back sheet 52 has the largest possible thickness in its thickness range described above. For example, the thickness of the back sheet 52 is preferably 0.06 mm or more. As the back sheet 52 is made thicker, the capacity formed between a ground electrode built in the electronic device 3 and the power receiver side active electrode 41A of the electrode sheet section 2A decreases. This enables to stabilize operations of the wireless power receiver device 2. On the other hand, reducing the thickness of the front sheet 51 decreases the thickness of the electrode sheet section 2A. In the present embodiment, the back sheet 52 is to be arranged on the side toward the electronic device 3 that serves as an attachment target, and has the thickness larger than that of the front sheet 51. This allows to have all the foregoing advantageous effects relating to the front sheet 51 and the back sheet 52 at the same time. In the present embodiment, the foregoing configuration allows the electrode sheet section 2A to have the thickness of, for example, about 0.2 mm. Thus, the electrode sheet section 2A may be inserted between the electronic device 3 and a protection case.

As described above, all the members that constitute the electrode sheet section 2A are transparent. Thus, the whole of the electrode sheet section 2A is transparent. Accordingly, even when the electrode sheet section 2A is attached to the electronic device 3, marking and the like on a surface of the electronic device 3 are visible through the electrode sheet section 2A, and the design of the electronic device 3 such as a smartphone or the like may not be impaired. In this example, the electrode sheet section 2A is made transparent in consideration of design. However, the electrode sheet section 2A is not necessarily transparent. For example, in such a case, inexpensive copper foils or silver foils may be used.

Figure 5:
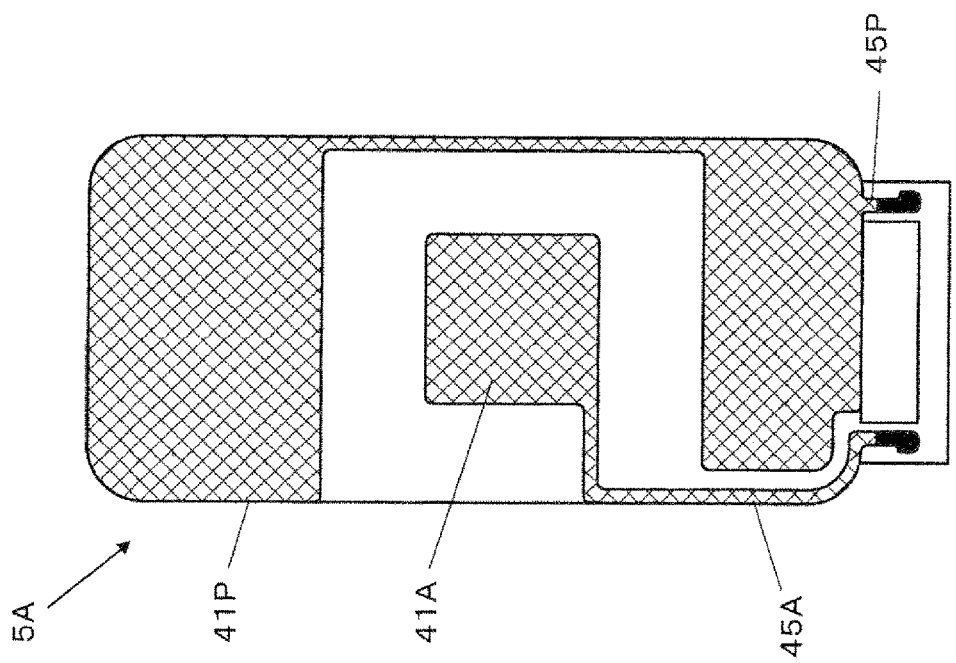
FIG. 5 is a diagram depicting a specific example of an electrode sheet section of a wireless power receiver device according to Embodiment 1.

FIG. 5 is a diagram depicting a specific example of the electrode sheet section 5A of the wireless power receiver device 2. In the electrode sheet section 5A, the power receiver side active electrode 41A is arranged substantially at a center, and the power receiver side passive electrode 41P is arranged at an upper portion and a lower portion. Further, the lead lines 45A and 45P extend from the electrodes 41A and 41P, respectively. These electrodes 41A and 45P and the lead lines 45A and 45P are provided between the front sheet 51 and the back sheet 52, as described with reference to FIG. 4. In the present example, the metal foils, which form the power receiver side active electrode 41A, the power receiver side passive electrode 41P, and the lead lines 45A and 45P, have mesh-like structures.

According to the wireless power receiver device 2 according to the present embodiment, the following advantageous effects may be obtained.

In the present embodiment, a portion including the power receiver side active electrode 41A and the power receiver side passive electrode 41P is formed into a sheet-like shape, thereby making it possible to decrease the thickness of the wireless power receiver device 2. Thus, even in the case where the wireless power receiver device 2 is attached to the electronic device 3, the thickness of the electronic device 3 does not increase significantly. Accordingly, it is still easy to carry around the electronic device 3 even with the wireless power receiver device 2 being attached thereto.

Further, in some cases, the electronic device 3 such as a smartphone is used while being encased in a protection case or the like. In the present embodiment, the sheet section 5A, which is to be attached to the rear surface of the electronic device, is of a thin type. Thus, even in the foregoing case, the sheet section 5A may be encased in a protection case together with the electronic device 3 such as a smartphone or the like while the sheet section 5A being attached to the rear surface of the electronic device 3. Further, the sheet section 5A is made transparent. Thus, even in the case where the sheet section 5A is attached to the protection case, the design of the protection case may not be impaired.

Further, arranging the power receiver side active electrode 41A and the power receiver side passive electrode 41P on the sheet section 5A, which is to be attached to the rear surface of the electronic device 3, allows to make efficient use of the rear surface of the electronic device 3 such as a smartphone and to increase areas of the power receiver side active electrode 41A and the power receiver side passive electrode 41P. This facilitates the improvement of electric power transmission efficiency.

Further, since the power receiver side active electrode 41A and the power receiver side passive electrode 41P are made transparent, the design of the electronic device 3 is not impaired even in the case where the areas of the power receiver side active electrode 41A and the power receiver side passive electrode 41P are increased. In this regard, it is easy to make the areas of the power receiver side active electrode 41A and the power receiver side passive electrode 41P larger.

Further, in the wireless power transmission system of the present embodiment, the wireless power transmitter device 1 includes the step-up unit 21, and the wireless power receiver device 2 includes the step-down unit 43. Accordingly, voltages higher than those used in the electronic device 3 and the like are applied across the power transmitter side passive electrode 31P and the power transmitter side active electrode 31A and across the power receiver side passive electrode 41P and the power receiver side active electrode 41A. This allows to increase the electric power transmission efficiency. Further, this reduces heat generation as well as transmission loss in the power transmitter side passive electrode 31P and the power transmitter side active electrode 31A (power transmitter side electrode section), the power receiver side passive electrode 41P and the power receiver side active electrode 41A (power receiver side electrode section), and the like. In the electromagnetic induction type wireless power transmission systems, the transmission loss or the heat generation are larger since larger electric currents flow through their coils. Further, as a result of that, it is necessary to increase the diameters of coil wires. Therefore, in the cases with the electromagnetic induction type wireless power transmission systems, even if a sheet section having a coil is provided, the thickness of such sheet section may be, for example, 1 mm or more. Thus, there is a limit to a minimum thickness in practice. Accordingly, it is difficult to insert the sheet section between the electronic device and the protection case.

3. Conclusion.

As described above, the wireless power receiver device 2 of the present embodiment includes the electrode sheet section 2A; and the power receiver section 2B, the electrode sheet section 2A including the active electrode 41A and the power receiver side passive electrode 41P that are substantially coplanar and formed into sheet-like shapes, the lead lines 45A and 45P that are coplanar with both the electrodes 41A and 41P, extended from the respective electrodes 41A and 41P, and formed into sheet-like shapes, and the insulation sheet 50 that covers both the electrodes 41A and 41P and both the lead lines 45A and 45P from both sides thereof, the power receiver section 2B including the step-down unit 43 that steps down an alternating-current voltage induced between end portions of the lead lines 45A and 45P, the power receiver module 44 that rectifies and smoothes the alternating-current voltage that is stepped down by the step-down unit 43, and the connector 46 for outputting an output voltage of the power receiver module 44.

In other words, in the wireless power receiver device 2, a portion including the power receiver side active electrode 41A and the power receiver side passive electrode 41P is formed as the sheet-like electrode sheet section. Accordingly, the electrode sheet section 2A including the power receiver side active electrode 41A and the power receiver side passive electrode 41P may be made thinner. Thus, the wireless power receiver device 2 as a whole may be made thinner and therefore made smaller.

In the wireless power receiver device 2 of the present embodiment,
the insulation sheet 50 is composed of the first insulation sheet 51 covering one side of both the electrodes 41A and 41P and both the lead lines 45A and 45P and the second insulation sheet 52 covering the other side of both the electrodes 41A and 41P and both the lead lines, and of the first insulation sheet 51 and the second insulation sheet 52, the insulation sheet 52, which is to be arranged on the side toward the electronic device that serves as the attachment target, is thicker than the other insulation sheet 51.

This allows to reduce the capacities formed between the ground electrode built in the electronic device and the power receiver side active electrode 41A and the power receiver side passive electrode 41P of the electrode sheet section 2A, thereby stabilizing operations of the wireless power receiver device 2.

Alternatively, the insulation sheet 50 may be provided with an adhesion layer 55 (see FIG. 4) at one of its principal surfaces.

This allows the electrode sheet section 2A to be attached and fixed to the electronic device 3.

Embodiment 2

Figure 6:
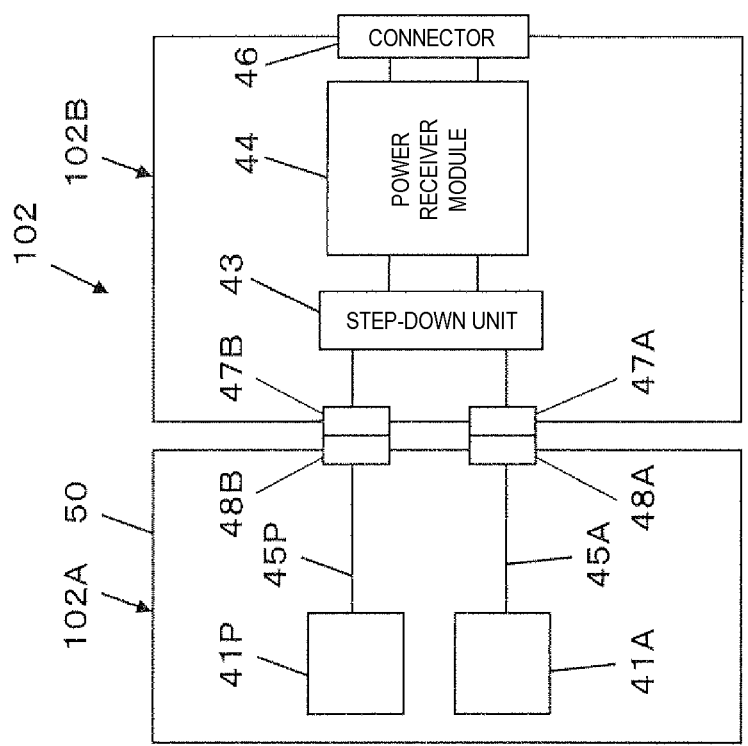
FIG. 6 is a block diagram depicting a configuration of a wireless power receiver device according to Embodiment 2.
Figure 7:
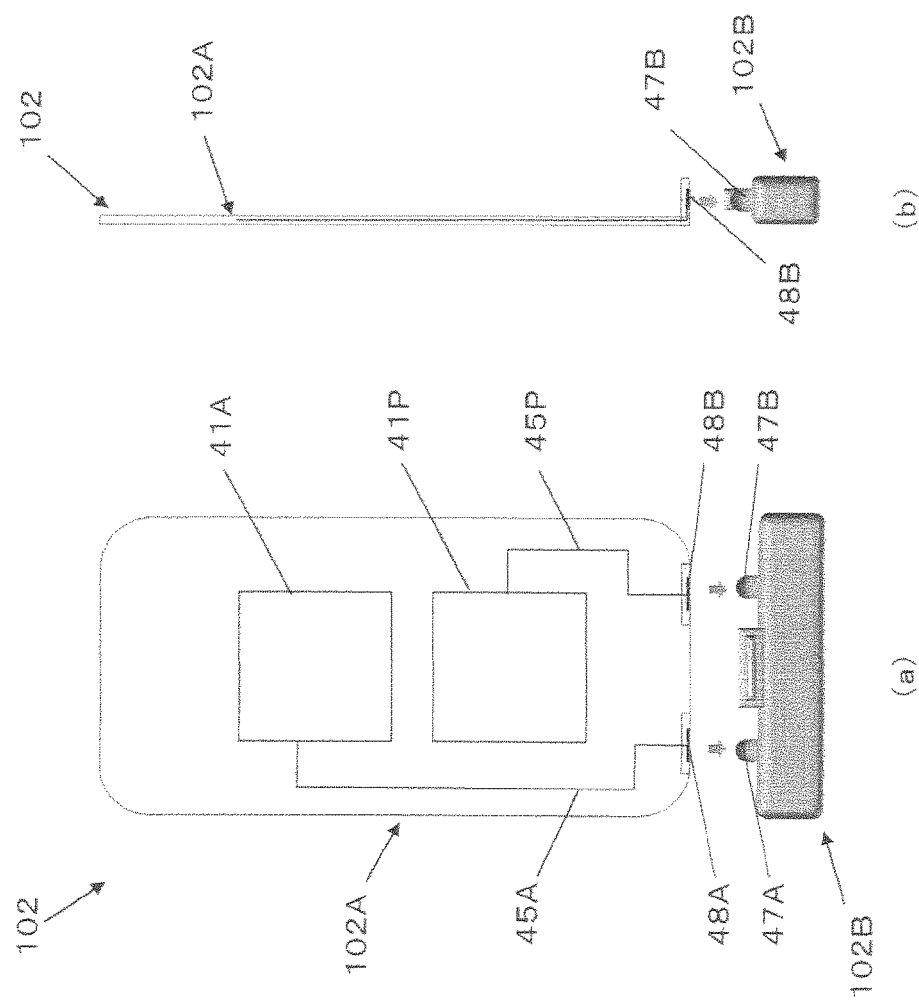
FIG. 7 is an external view of a wireless power receiver device according to Embodiment 2.

A wireless power receiver device according to Embodiment 2 is now described. FIG. 6 is a block diagram depicting the configuration of the wireless power receiver device according to Embodiment 2. FIG. 7 is an external view of the wireless power receiver device according to Embodiment 2. Specifically, FIG. 7(a) is a rear view of the wireless power receiver device according to Embodiment 2. FIG. 7(b) is a side view of the wireless power receiver device according to Embodiment 2.

In the wireless power receiver device 102 according to the present embodiment, an electrode sheet section 102A and a power receiver section 102B are separable. Specifically, the power receiver section 102 is provided with spring connectors 47A and 47B. The spring connectors 47A and 47B are connected to input wiring of the step-down unit 43. The electrode sheet section 102A is provided with a first connection terminal 48A and a second connection terminal 48B that are connectable to the spring connectors 47A and 47B of the power receiver section 102. The first connection terminal 48A is connected to an end portion of the lead line 45A extending from the power receiver side active electrode 41A, and the second terminal 48B is connected to an end portion of the lead line 45P extending from the power receiver side passive electrode 41B. Other configuration elements are identical to those in Embodiment 1.

Figure 8:
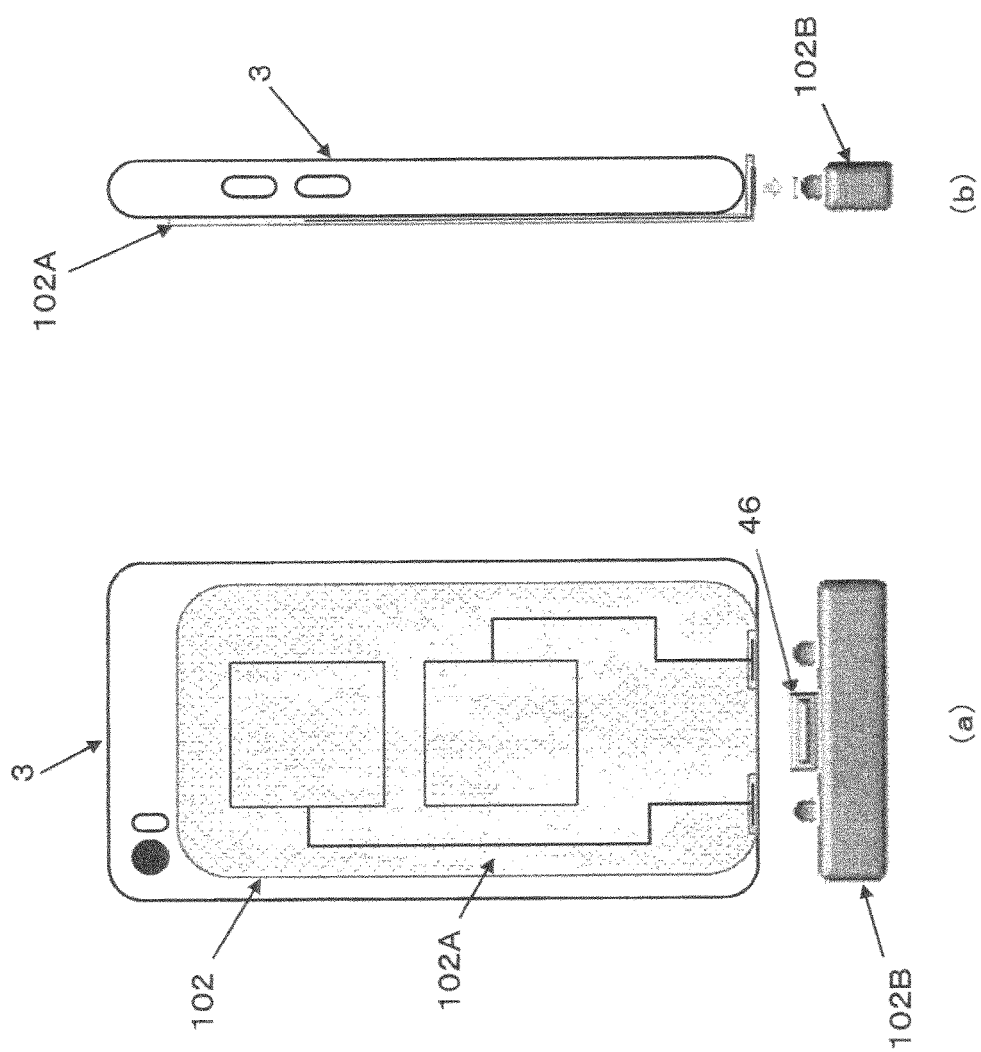
FIG. 8 is a diagram depicting a state where a wireless power receiver device according to Embodiment 2 is attached to an electronic device.

FIG. 8 is a diagram depicting the state where the wireless power receiver device according to Embodiment 2 is attached to an electronic device. Specifically, FIG. 8(a) is a rear view in the state where the wireless power receiver device according to Embodiment 2 is attached to an electronic device. FIG. 8(b) is a side view in the state where the wireless power receiver device according to Embodiment 2 is attached to an electronic device.

For example, with the wireless power receiver device 102 in the present embodiment, it is possible to adopt the utilization method in which only the electrode sheet section 102A is attached to the electronic device 3 when the electronic device 3 is in use, and the electrode sheet section 102A is connected to the power receiver section 102B at the time of charging. In this structure, the spring connectors 47A and 47B and the connector 46 are provided on the same surface of the power receiver section 102B. Thus, when the power receiver section 102B is connected to the electronic device 3, the electrode sheet 102A is also connected to the power receiver section 102B at the same time. Further, in this structure, contacting portions of the electrode sheet 102A are sandwiched between the power receiver section 102B and the electronic device 3 so as not to be externally exposed. Thus, there is no accident such as discharge and the like caused when the contacting portion is brought into contact with an external object. This improves user-friendliness in use of the electronic device 3 in the cases where the wireless power receiver device 102 is utilized. Further, this does not impair the design of the electronic device 3.

Further, with the wireless power receiver device 102 in the present embodiment, it is possible to exchange the electrode sheet section 102A. In this case, the present embodiment is applicable to various kinds of electronic devices by preparing various kinds of the electrode sheet section 102A corresponding to the various kinds of electronic devices. Preferably, in this case, the power receiver section 102B is configured so as to be capable of handling power consumptions of the various kinds of electronic device 3. Accordingly, compatibility with various kinds of the electronic device 3 may be provided by combining multiple kinds of the electrode sheet section 102A and a single unit of the power receiver section 102B.

Figure 9:
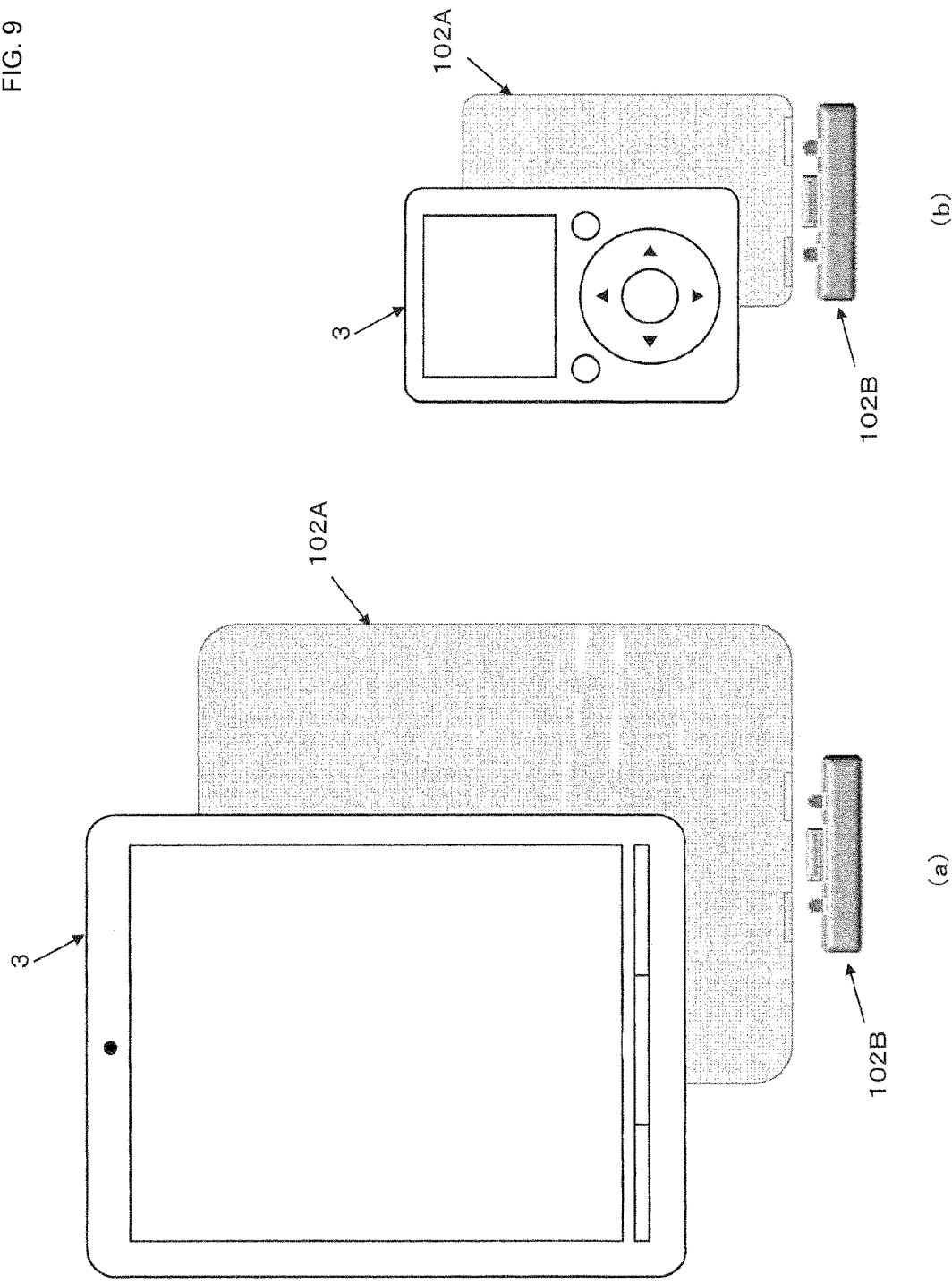
FIG. 9 is a diagram depicting examples of an electrode sheet section, which correspond to various electronic devices, in a wireless power receiver device according to Embodiment 2.

FIG. 9 is a diagram depicting examples of the electrode sheet section, which correspond to various kinds of the electronic device, in the wireless power receiver device according to Embodiment 2. FIG. 9(a) depicts the case where the electronic device 3 is a tablet terminal. FIG. 9(b) depicts the case where the electronic device 3 is a music player. As depicted in these figures, the shape of the electrode sheet section 102A may be changed depending on the electronic device 3. Further, the same wireless power transmitter device may be used even if the electrode sheet section 102A is exchanged as long as the shapes and the sizes of the active electrode and the passive electrode in the electrode sheet section 102A are standardized.

As described above, in the wireless power receiver device 102 according to the present embodiment, the electrode sheet section 102A and the power receiver section 102B is separable from each other. This improves user-friendliness in use of the electronic device 3. Further, the compatibility with various kinds of the electronic device 3 may be provided only by exchanging the electrode sheet section 102A.

Embodiment 3

Figure 10:
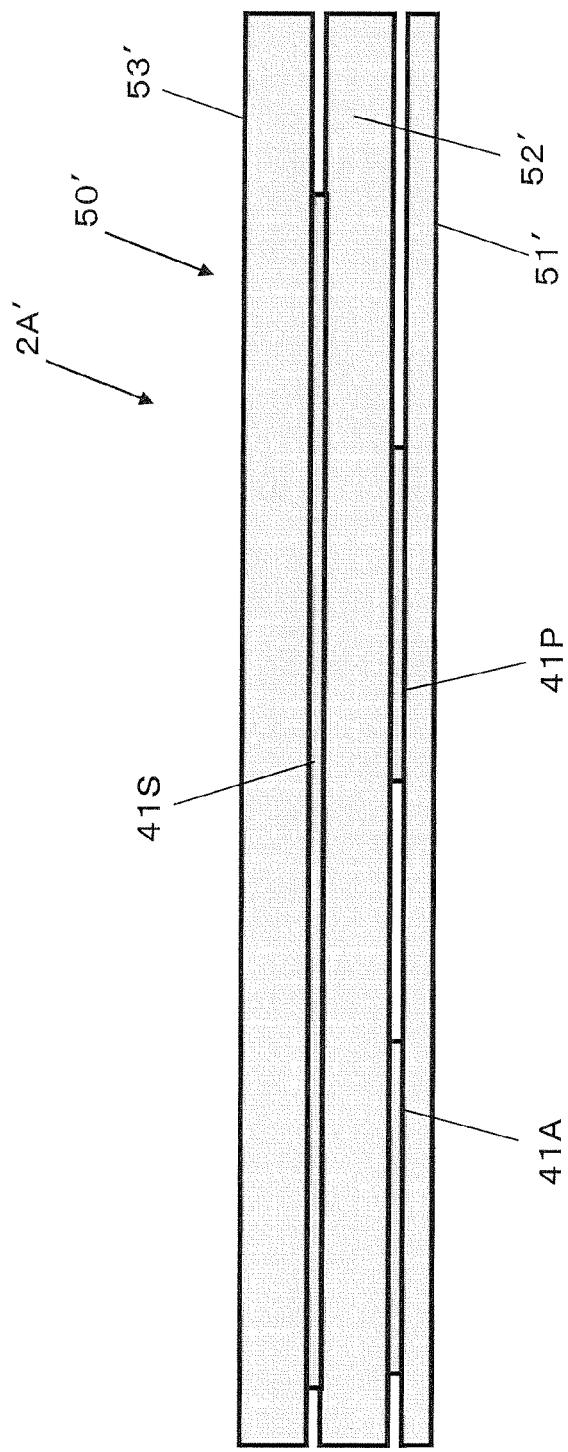
FIG. 10 is a cross sectional diagram of an electrode sheet of a wireless power receiver device according to Embodiment 3.

A wireless power receiver device according to Embodiment 3 is now described. In the present embodiment, the structure of electrode sheet section differs from that of the electrode sheet section 2A in Embodiment 1. FIG. 10 is a cross sectional diagram of the electrode sheet of Embodiment 3. In the present embodiment, an insulation sheet 50' of the electrode sheet section 2A' includes three layers of sheets 51', 52', and 53'. Specifically, the electrode sheet section 2A' includes the front sheet 51' forming the top surface of the electrode sheet section 2A', the back sheet 53' forming the back surface of the electrode sheet section 5', and the middle sheet 52' disposed between these sheets. The power receiver side passive electrode 41P and the power receiver side active electrode 41A are provided between the front sheet 51' and the middle sheet 52'. A shield electrode 41S is provided between the front sheet 51' and the middle sheet 52'. The shield electrode 41S is connected to the power receiver side passive electrode 41P and also functions as a passive electrode.

In other words, in the wireless power receiver device according to the present embodiment, the shield electrode 41S having a sheet-like shape is provided on one of the principal surfaces of the insulation sheet 50', and the back sheet 53' is provided at a side of the shield electrode 41S, which is opposite to the side where the front sheet 51' and the middle sheet 52' are provided.

The foregoing structure prevents, among the electronic devices, variations in capacity formed between the ground electrode built in the electronic device 3 and the power receiver side active electrode 41A of the electrode sheet section 2A'. Accordingly, the distance between the power receiver side active electrode 41A and the shield electrode 41S is determined by the sheet, not by the device, thereby making it possible to achieve sheet standardization.

Embodiment 4

Figure 11:
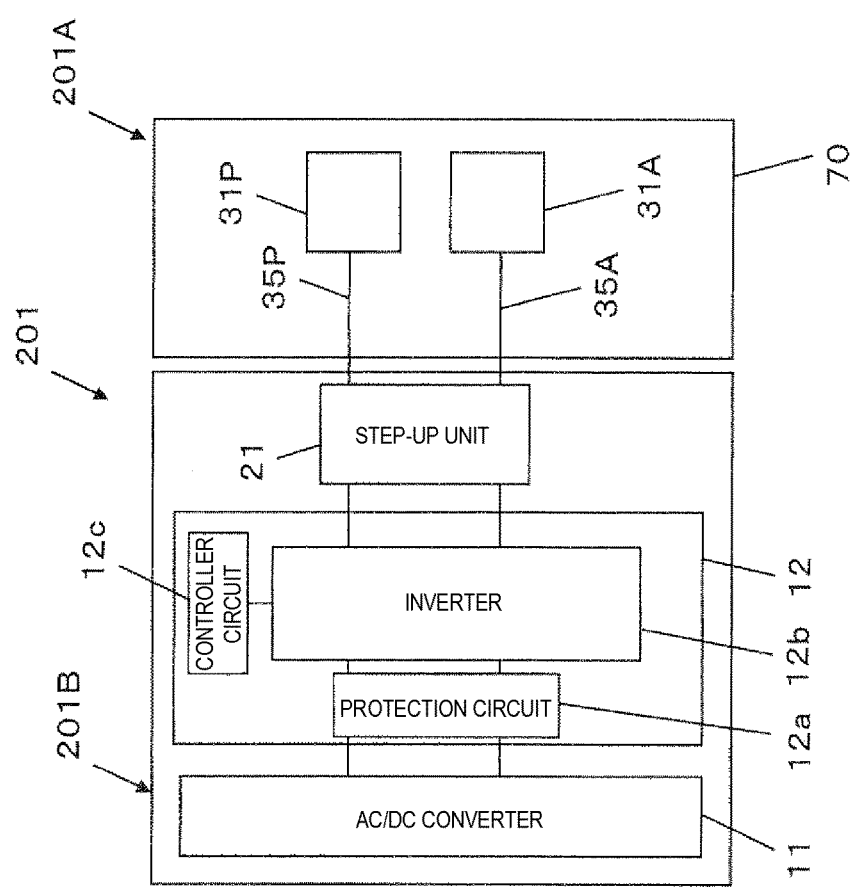
FIG. 11 is a block diagram depicting a configuration of a wireless power transmitter device according to Embodiment 4.
Figure 12:
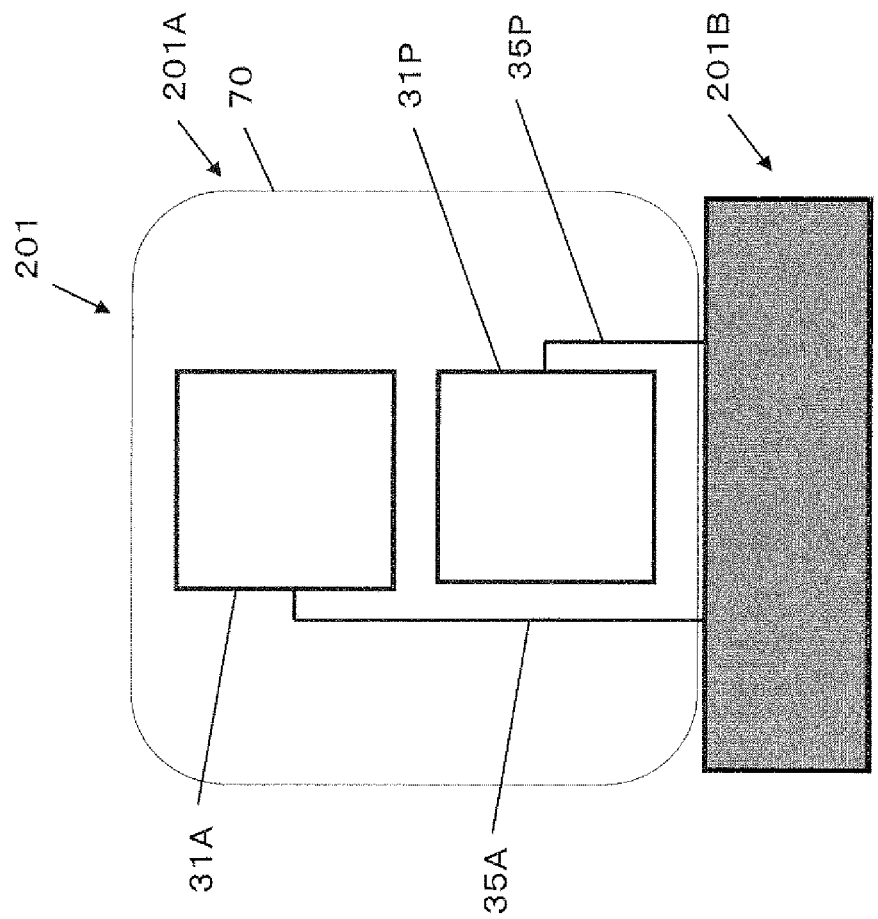
FIG. 12 is an external view of a wireless power transmitter device according to Embodiment 4.

A wireless power transmitter device according to Embodiment 4 is now described. FIG. 11 is a block diagram depicting the configuration of the wireless power transmitter device according to Embodiment 4. FIG. 12 is an external view of the wireless power transmitter device according to Embodiment 4. Specifically, FIG. 12 is a rear view of the wireless power transmitter device according to Embodiment 4.

The wireless power transmitter device 201 includes, as is the case with the wireless power transmitter device 1 according to Embodiment 1, an AC/DC converter 11, a power transmitter module 12, a step-up unit 21, and a power transmitter side passive electrode 31P and a power transmitter side active electrode 31A (power transmitter side electrode section).

The wireless power transmitter device 201 of the present embodiment includes, as is the case with the wireless power receiver device 2 described in the foregoing Embodiment 1, a power transmitter section 201B and a sheet-like electrode sheet section 201A. The power transmitter section 201B is provided with the AC/DC converter 11, the power transmitter module 12, and the step-up unit 21.

The electrode sheet section 201A is provided with the power transmitter side passive electrode 31P and the power transmitter side active electrode 31A. Further, the electrode sheet section 201A is provided with lead lines 35A and 35P for connecting the power transmitter side active electrode 31A and the power transmitter section 201B. An insulation sheet 70 covers the power transmitter side passive electrode 31P, the power transmitter side active electrode 31A, and the lead lines 35A and 35P. It should be noted that the electrode sheet section 201A has a base configuration similar to that of the electrode sheet section 2A in the wireless power receiver device 2, which is described with reference to FIG. 4. Therefore, detailed descriptions thereof are omitted.

Figure 13:
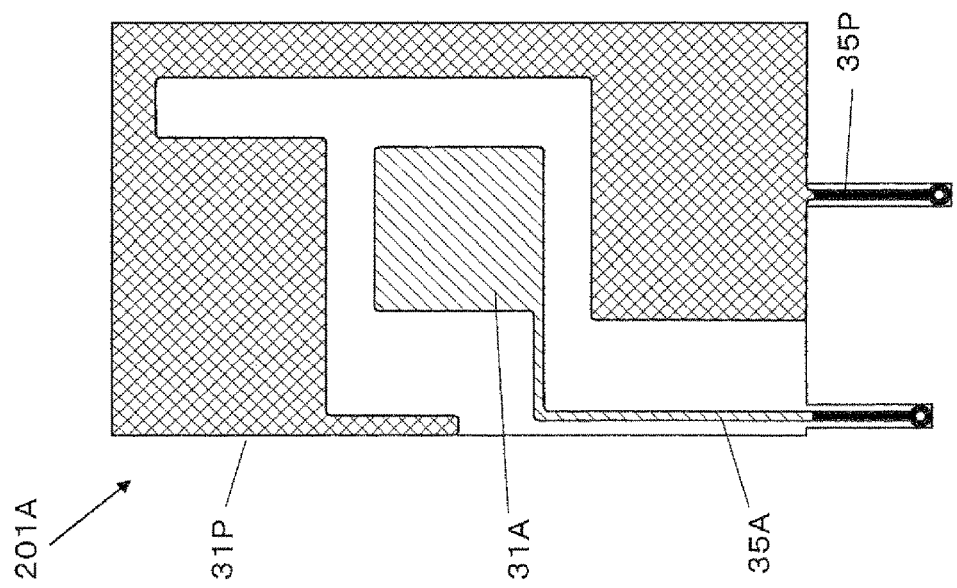
FIG. 13 is a diagram depicting a specific example of an electrode sheet section of a wireless power transmitter device according to Embodiment 4.

FIG. 13 is a diagram depicting a specific example of an electrode sheet section 201A of the wireless power transmitter device 201. In the electrode sheet section 201A, the power transmitter side active electrode 31A is arranged substantially at a center, and the power transmitter side passive electrode 31P is arranged at an upper portion and a lower portion. Further, the lead lines 35A and 35P extend from the electrodes 31A and 31P, respectively.

Figure 14:
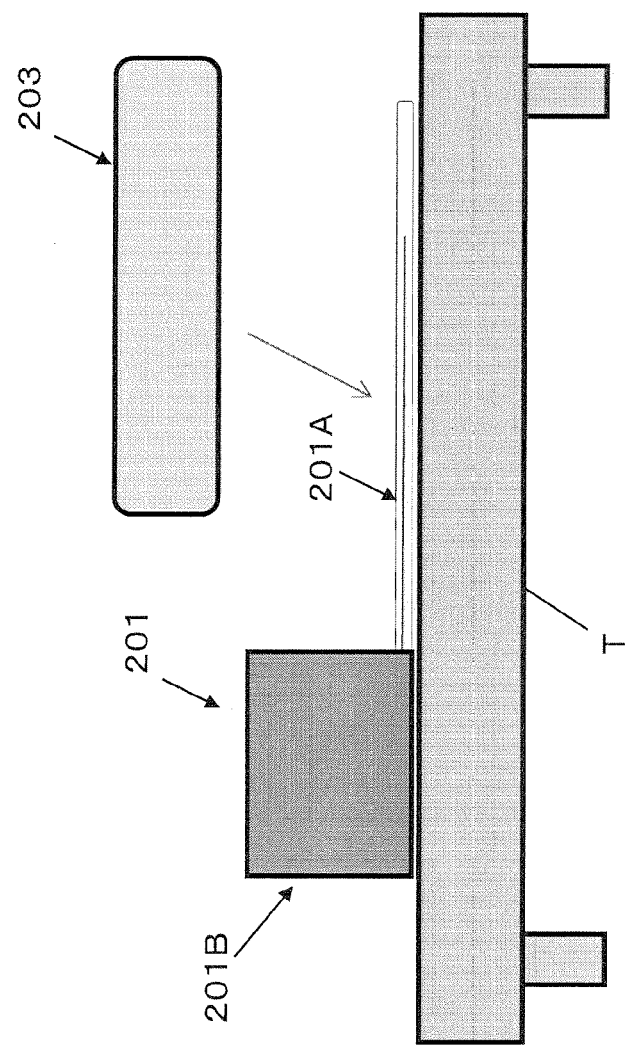
FIG. 14 is a diagram depicting an exemplary way of utilization of a wireless power transmitter device according to Embodiment 4.

FIG. 14 is a diagram depicting an exemplary mode of utilization of the wireless power transmitter device according to Embodiment 4. Referring to FIG. 14, the wireless power transmitter device 201 is placed on a table T. Placing, for example, an electronic device 203 with wireless power receiving capability on the electrode sheet section 201A of this wireless power transmitter device 201 allows the electronic device 203 to be wirelessly charged. In this way, the table T may be used as a charger base by simply placing the electrode sheet section 201A of the wireless power transmitter device 201 on the table T. Alternatively, the electrode sheet section 201A may be attached to the table T. This prevents the wireless power transmitter device 201 from moving on the table T or changing its shape. Further, the design of the table T may not be impaired by using a transparent electrode sheet section as the electrode sheet section 201A.

Alternatively, the electronic device 203 may not be provided with the wireless power receiving capability. For example, the electronic device 203 may be the electronic device 3 described in Embodiment 1, to which the wireless power receiver device 2 is attached.

Further, the wireless power transmitter device 201 may be placed on the electronic device 203. Even in this case, the transmission of electric power may be performed between the wireless power transmitter device 201 and the electronic device 203.

Further, in the example of FIG. 14, the power transmitter section 201B is placed on the upper surface of the table T. Alternatively, the power transmitter section 201B may be stowed under the table T. This prevents from affecting the design of the table T. Further, this facilitates use of the table.

As described above, the wireless power transmitter device 201 of the present embodiment includes the electrode sheet section 201A; and the power transmitter section 201B, the electrode sheet section 201A including the power transmitter side active electrode 31A and the power transmitter side passive electrode 31P that are substantially coplanar and formed into sheet-like shapes, the lead lines 35A and 35P that are coplanar with both the electrodes 31A and 31P, extended from the respective electrodes 31A and 31P, and formed into sheet-like shapes, and the insulation sheet 70 that covers both the electrodes 31A and 31P and both the lead lines 35A and 35P from both sides thereof, the power transmitter section 201B including the inverter unit 12b that converts a direct-current voltage to an alternating-current voltage having a predetermined frequency, and the step-up unit 21 that steps up the alternating-current voltage outputted from the inverter unit 12b and applies to end portions of the lead lines 35A and 35P.

In other words, in the wireless power transmitter device 201A, a portion including the power transmitter side active electrode 31A and the power transmitter side passive electrode 31P is formed as the sheet-like electrode sheet section 201. Accordingly, the electrode sheet section 201 including the power transmitter side active electrode 31A and the power transmitter side passive electrode 31P as well as the lead lines 35A and 35P may be made thinner. Thus, the wireless power receiver device 201 as a whole may be made thinner and therefore made smaller.

Further, in the wireless power transmitter device 201 of the present embodiment, the electrode sheet section 201A and the power transmitter section 201B may be configured to be separable, as is the case with the electrode sheet section 102A and the power receiver section 102B in Embodiment 2.

In this way, the compatibility with various kinds of the electronic devices 203 may be provided only by exchanging the electrode sheet section 201A.

Further, in the wireless power transmitter device 201 of the present embodiment, an adhesion layer may be formed at one of principle surfaces of the insulation sheet 70.

This allows the electrode sheet section 201A to be fixed to the electronic device 3 or the table T.

Embodiment 5

Figure 15:
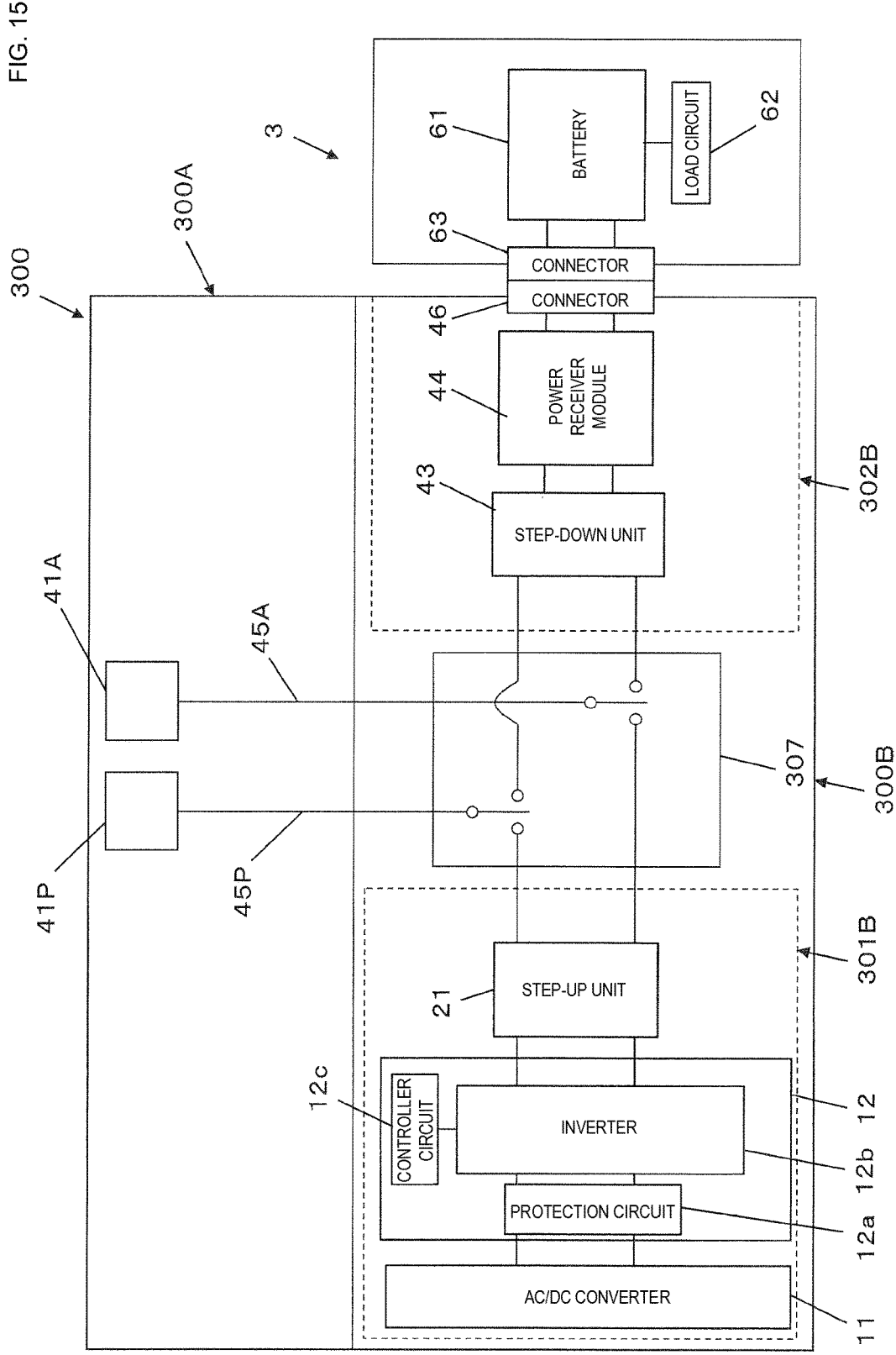
FIG. 15 is a block diagram depicting a configuration of a wireless power transceiver device according to Embodiment 5.

FIG. 15 is a block diagram depicting the configuration of a wireless power transceiver device according to Embodiment 5. The wireless power transceiver device 300 of the present embodiment achieves functionalities of both the wireless power receiver device and the wireless power transmitter device. Specifically, the wireless power transceiver device 300 of the present embodiment includes a power transceiver section 300B and an electrode sheet section 300A. The power transceiver section 300B includes a power transmitter section 301B, a power receiver section 302B, and a selector unit 307.

The electrode sheet section 300A has a sheet-like shape and includes the same configuration as that of the electrode sheet section 2A of Embodiment 1. The power transmitter section 301B includes the same configuration as that of the power transmitter section 201B of Embodiment 4. The power receiver section 302B includes the same configuration as that of the power receiver section 102B of Embodiment 1. Thus, descriptions regarding the electrode sheet section 300A, the power transmitter section 301B, and the power receiver section 302B are omitted.

The selector unit 307 switches between the output of the power transmitter section 301B and the output of the power receiver section 302B and outputs to the active electrode 41A and the passive electrode 41P. In other words, the electrode sheet section 300A is shared by the power transmitter section 301B and the power receiver section 302B.

The present embodiment allows to switch and use the wireless power transmitting functionality of the power transmitter section 301B and the wireless power receiving functionality of the power receiver section 302B.

As described above, the wireless power transceiver device 300 of the present embodiment includes the electrode sheet section 300A; the power receiver section 302B; the power transmitter section 301B; and the selector unit 307, the electrode sheet section 300A including the active electrode 41A and the passive electrode 41P that are substantially coplanar and formed into sheet-like shapes, the lead lines 45A and 45P that are coplanar with both the electrodes 41A and 41P, extended from the respective electrodes 41A and 41P, and formed into sheet-like shapes, and the insulation sheet 50 that covers both the electrodes 41A and 41P and both the lead lines 45A and 45P from both sides thereof, the power receiver section 302B including the step-down unit 43 that steps down an alternating-current voltage induced between end portions of the lead lines 45A and 45P, the power receiver module 44 that rectifies and smoothes the alternating-current voltage that is stepped down by the step-down unit 43, and the connector 46 for outputting an output voltage of the power receiver module 44, the power transmitter section 301B including the inverter unit 12b that converts a direct-current voltage to an alternating-current voltage having a predetermined frequency, and the step-up unit 21 that steps up the alternating-current voltage outputted from the inverter unit 12b and applies to end portions of the lead lines 45A and 45P, the selector unit 307 being configured to alternatively connect the end portions of the lead lines 45A and 45P to one of an output section of the step-up unit 21 and an input section of the step-down unit 43.

This allows to switch and use the wireless power transmitting functionality of the power transmitter section 301B and the wireless power receiving functionality of the power receiver section 302B.

In the wireless power transceiver device 300 of the present embodiment, the electrode sheet section 300A and the power transceiver section 300B including the power receiver section 302B, the power transmitter section 301B, and the selector unit 307 may be configured to be separable.

In this way, the compatibility with various kinds of the electronic device 3 may be provided only by exchanging the electrode sheet section 300A.

Embodiment 6

Figure 16:
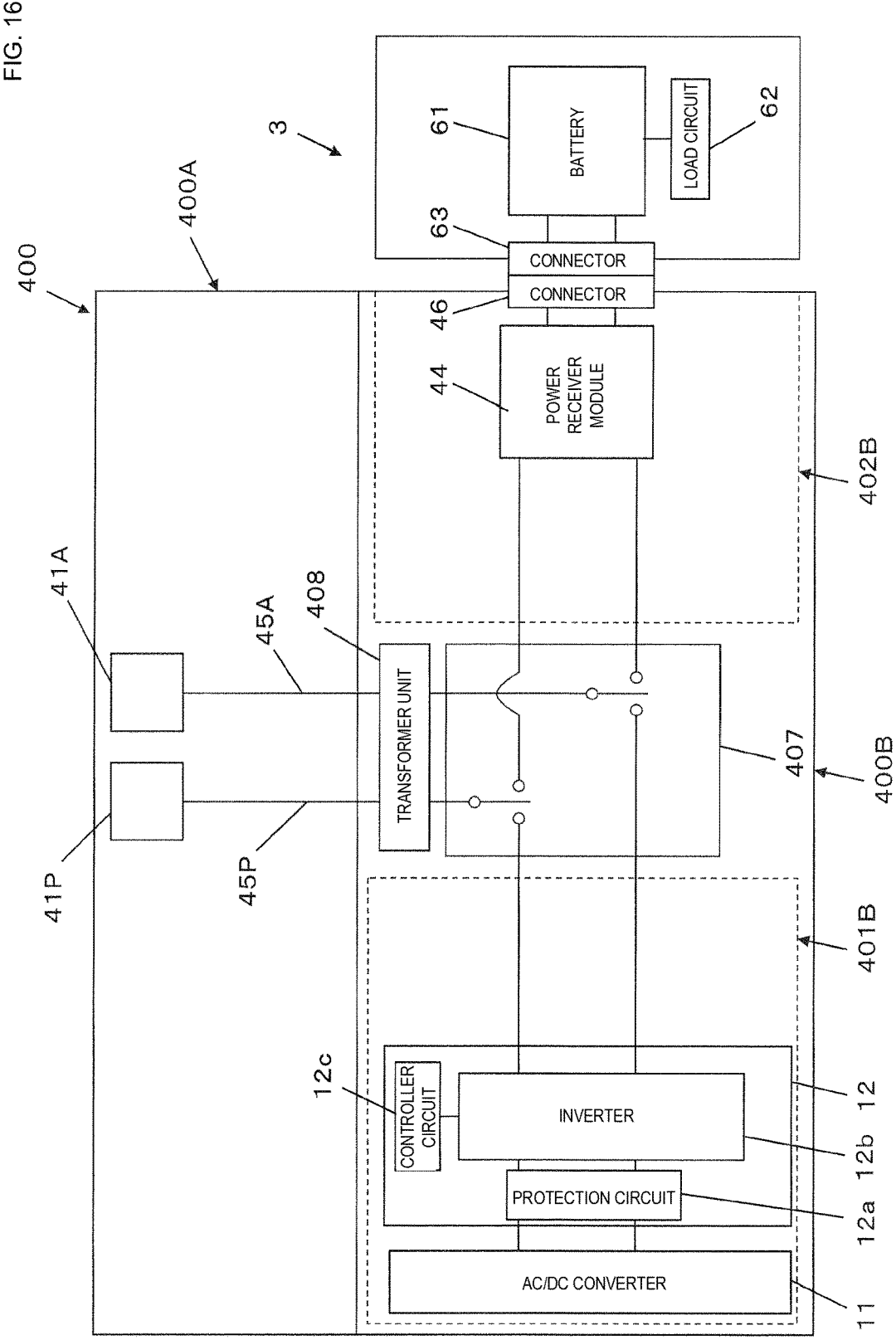
FIG. 16 is a block diagram depicting a configuration of a wireless power transceiver device according to Embodiment 6.

FIG. 16 is a block diagram depicting the configuration of a wireless power transceiver device according to Embodiment 6. The wireless power transceiver device 400 of the present embodiment achieves functionalities of both the wireless power receiver device and the wireless power transmitter device. Specifically, the wireless power transceiver device 400 of the present embodiment includes a power transceiver section 400B and an electrode sheet section 400A. The power transceiver section 400B includes a power transmitter section 401B, a power receiver section 402B, a selector unit 407, and a transformer unit 408.

The electrode sheet section 400A includes the same configuration as that of the electrode sheet section 2A of Embodiment 1.

The power transmitter section 401B includes the AC/DC converter 11 and the power transmitter module 12, which are similar to those in Embodiment 1.

The power receiver section 302B includes the power receiver module 44 and the connector 46, which are similar to those in Embodiment 1.

The selector unit 407 selectively connects a low voltage side of the transformer unit 408 to the output of the inverter 12b of the power transmitter section 401B or to the input of the power receiver module 44 of the power receiver section 402B.

Terminals of the transformer unit 408 at the side opposite to the selector unit 407 are connected to the active electrode 41A and the passive electrode 41P (lead lines 45A and 45P). In the transformer unit 408, the selector unit 407 side is the low voltage side, and the side facing toward the active electrode 41A and the passive electrode 41P is the high voltage side.

As described above, in the present embodiment, the electrode sheet section 400A and the transformer unit 408 are shared by the power transmitter section 401B and the power receiver section 402B.

The present embodiment allows to switch and use the wireless power transmitting functionality of the power transmitter section 401B and the wireless power receiving functionality of the power receiver section 402B.

As described above, the wireless power transceiver device 400 of the present embodiment includes the electrode sheet section 400A; the transformer unit 408; the power receiver section 402B; the power transmitter section 401B; and the selector unit 407, the electrode sheet section 400A including the power receiver side active electrode 41A and the power receiver side passive electrode 41P that are substantially coplanar and formed into sheet-like shapes, the lead lines 45A and 45P that are coplanar with both the electrodes 41A and 41P, extended from the respective electrodes 41A and 41P, and formed into sheet-like shapes, and the insulation sheet 50 that covers both the electrodes 41A and 41P and both the lead lines 45A and 45P from both sides thereof, the transformer unit 408 being connected to end portions of the lead lines 45A and 45P at the high voltage side, the power receiver section 402B including the power receiver module 44 that rectifies and smoothes an alternating-current voltage that is stepped down by the transformer unit 408, and the connector 46 for outputting an output voltage of the power receiver module 44, the power transmitter section 401B including the inverter 12b that converts a direct-current voltage to an alternating-current voltage having a predetermined frequency, the selector unit 407 being configured to selectively connect the low voltage side of the transformer unit 408 to the output of the inverter 12b of the power transmitter section 401B or to the input of the power receiver module 44 of the power receiver section 402B.

This allows to switch and use the wireless power transmitting functionality of the power transmitter section 401B and the wireless power receiving functionality of the power receiver section 402B. Further, the single transformer unit 408 is capable of stepping up the output voltage from the inverter 12b and stepping down of the input voltage to the power receiver module 44. In Embodiment 5, two transformer units, namely, the step-down unit and the step-up unit are required. Here, however, less number of transformer units is acquired. Further, the selector unit 407 is provided on the low voltage side of the transformer unit 408. Thus, the selector unit 407 may be implemented with components having withstanding voltages less than those used in the case of Embodiment 5.

Further, in the wireless power transceiver device 400 of the present embodiment, the electrode sheet section 400A and the power transceiver section 400B including the power receiver section 402B, the power transmitter section 401B, the selector unit 407, and the transformer unit 408 may be configured to be separable.

Accordingly, the compatibility with various kinds of the electronic device 3 may be provided only by exchanging the electrode sheet section 400A.

Another Embodiment

Figure 17:
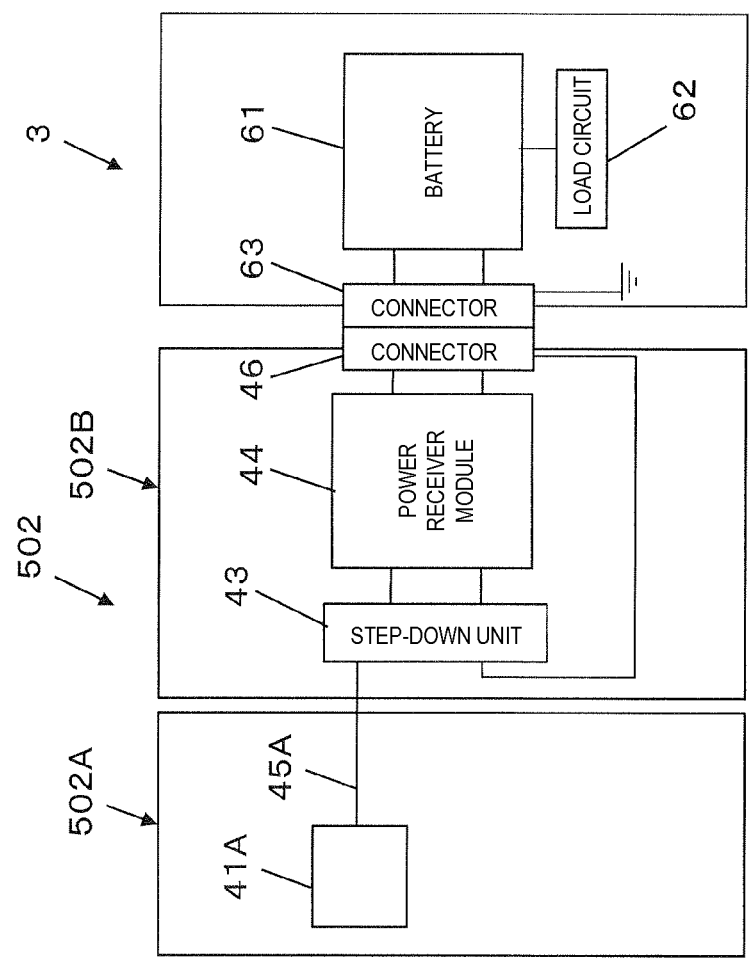
FIG. 17 is a block diagram depicting a configuration of a wireless power receiver device according to another embodiment.
Figure 18:
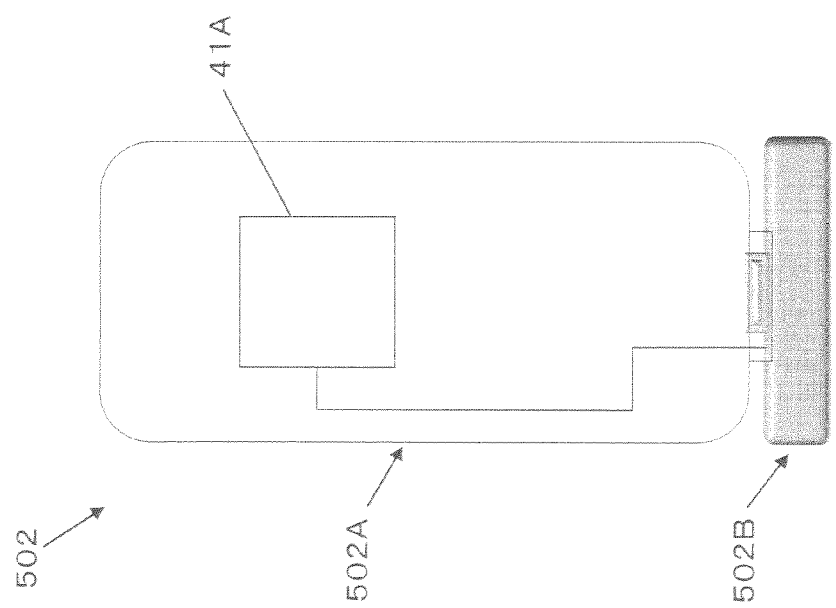
FIG. 18 is an external view of a wireless power receiver device according to another embodiment.

A wireless power receiver device according to another embodiment is now described. FIG. 17 is a block diagram depicting still another example of the configuration of a wireless power receiver device. FIG. 18 is an external view of the wireless power receiver device. In the wireless power receiver device 502 depicted in these figures, an electrode sheet section 502A is provided only with the power receiver side active electrode 41A, and is not provided with the passive electrode. In this configuration, a ground electrode of the electronic device 3 is used as the passive electrode. For example, one of input terminals of the step-down unit 43 of the power receiver section 502B is connected to the ground electrode of the electronic device 3 via the connectors 46 and 63. This configuration allows to simplify the configuration of the wireless power receiver device 502.

REFERENCE SIGNS LIST 1, 201 Wireless power transmitter device
2, 102 Wireless power receiver device
2A, 102A, 201A, 300A, 400A Sheet section
2B, 102B, 302B, 402B Power receiver section
3 Electronic device
11 AC/DC converter
12 Power transmitter module
12a Protection circuit
12b Inverter
12c Controller circuit
21 Step-up unit
31A Power transmitter side active electrode
31P Power transmitter side passive electrode
35A, 35P Lead line
41A Power receiver side active electrode
41P Power receiver side passive electrode
41S Shield electrode
43 Step-down unit
44 Power receiver module
45A, 45P Lead line
46 Connector
47A Spring connector
47B Spring connector
48A First connection terminal
48B Second connection terminal
50 Insulation sheet
51 Front sheet
52 Back sheet
55 Adhesion layer
51' Front sheet
52' Middle sheet
53' Back sheet
50' Insulation sheet
70 Insulation sheet
61 Battery
62 Load circuit
63 Connector 203 Electronic device
201B, 301B, 401B Power transmitter section
300, 400 Wireless power transceiver device
300B, 400B Power transceiver section
307, 407 Selector unit
408 Transformer section

The invention claimed is:

1. A wireless power receiver device, comprising:
an electrode sheet including:
    an active electrode and a passive electrode that are substantially coplanar,
    a pair of lead lines that are coplanar with the active and passive electrodes and extend therefrom, respectively, and
    a planar insulator that covers both sides of the active and passive electrodes and the pair of lead lines; and
a power receiver including:
    a step-down unit configured to step down an alternating-current voltage induced between the pair of lead lines,
    a rectifying-and-smoothing circuit that rectifies and smoothes the alternating-current voltage stepped down by the step-down unit, and
    a connector configured to output an output voltage of the rectifying-and-smoothing circuit,
    wherein the connector is coupled to an edge of the planar insulator and includes a connector port that faces a direction parallel to the planar insulator.

2. The wireless power receiver device according to claim 1, wherein the planar insulator comprises a first insulation sheet that covers a first side of the active and passive electrodes and the pair of lead lines and a second insulation sheet that covers a second side of both the active and passive electrodes and the pair of lead lines.

3. The wireless power receiver device according to claim 1, wherein the electrode sheet further comprises a planar shield disposed on a principal surface of the planar insulator, and an insulation sheet is disposed on the shield electrode on a side thereof that is opposite to the insulation sheet.

4. The wireless power receiver device according to claim 1, wherein the electrode sheet and the power receiver are separable.

5. The wireless power receiver device according to claim 4, wherein the power receiver comprise a pair of spring connectors coupled to input wiring of the step-down unit and configured to attach to the pair of lead lines, respectively.

6. The wireless power receiver device according to claim 1, wherein the step-down unit is a transformer.

7. The wireless power receiver device according to claim 1, wherein the planar insulator includes the adhesion property on an outer surface of the planar insulator for connecting the wireless power receiver device to an electronic device to receive the output voltage.

8. The wireless power receiver device according to claim 7, wherein the electrode sheet is configured to be attached to a primary surface of the electronic device, and wherein the connector is positioned to be connected to a port on a side surface of the electronic device that extends orthogonally to the primary surface of the electronic device.

9. The wireless power receiver device according to claim 1, wherein the active and passive electrodes are configured to wirelessly receive power from a power transmission device, and the connector is configured to output the output voltage to an electronic device coupled thereto in response to the active and passive electrodes wirelessly receiving the power from the power transmission device.

10. A wireless power receiver device, comprising:
an electrode sheet including:
    an active electrode and a passive electrode that are substantially coplanar,
    a pair of lead lines that are coplanar with the active and passive electrodes and extend therefrom, respectively, and
    an insulator that covers both sides of the active and passive electrodes and the pair of lead lines; and
a power receiver including:
    a step-down unit configured to step down an alternating-current voltage induced between the pair of lead lines,
    a rectifying-and-smoothing circuit that rectifies and smoothes the alternating-current voltage stepped down by the step-down unit, and
    a connector configured to output an output voltage of the rectifying-and-smoothing circuit,
wherein the insulator includes a first insulation sheet that covers a first side of the active and passive electrodes and the pair of lead lines and also includes a second insulation sheet that covers a second side of both the active and passive electrodes and the pair of lead lines, and
wherein the first insulation sheet is thicker than the second insulation sheet and is disposed adjacent to an electronic device when the electrode sheet is attached to the electronic device.

11. A wireless power receiver device, comprising:
an electrode sheet including:
    an active electrode and a passive electrode that are substantially coplanar,
    a pair of lead lines that are coplanar with the active and passive electrodes and extend therefrom, respectively, and
    a planar insulator that covers both sides of the active and passive electrodes and the pair of lead lines; and
a power receiver including:
    a step-down unit configured to step down an alternating-current voltage induced between the pair of lead lines,
    a rectifying-and-smoothing circuit that rectifies and smoothes the alternating-current voltage stepped down by the step-down unit, and
    a connector configured to output an output voltage of the rectifying-and-smoothing circuit, the connector being coupled to an edge of the planar insulator and including a connector port that extends in a direction non-coplanar with the active and passive electrodes and the planar insulator.

12. The wireless power receiver device according to claim 11, wherein the active and passive electrodes are configured to wirelessly receive power from a power transmission device, and the connector is configured to output the output voltage to an electronic device coupled thereto in response to the active and passive electrodes wirelessly receiving the power from the power transmission device.

* * * * *